Feb. 1, 1966 A. C. DUCATI 3,233,147
APPARATUS AND METHOD FOR GENERATING HIGH-INTENSITY LIGHT
AND A HIGH TEMPERATURE AND MACH NUMBER PLASMA STREAM
Original Filed Sept. 29, 1958 3 Sheets-Sheet 1
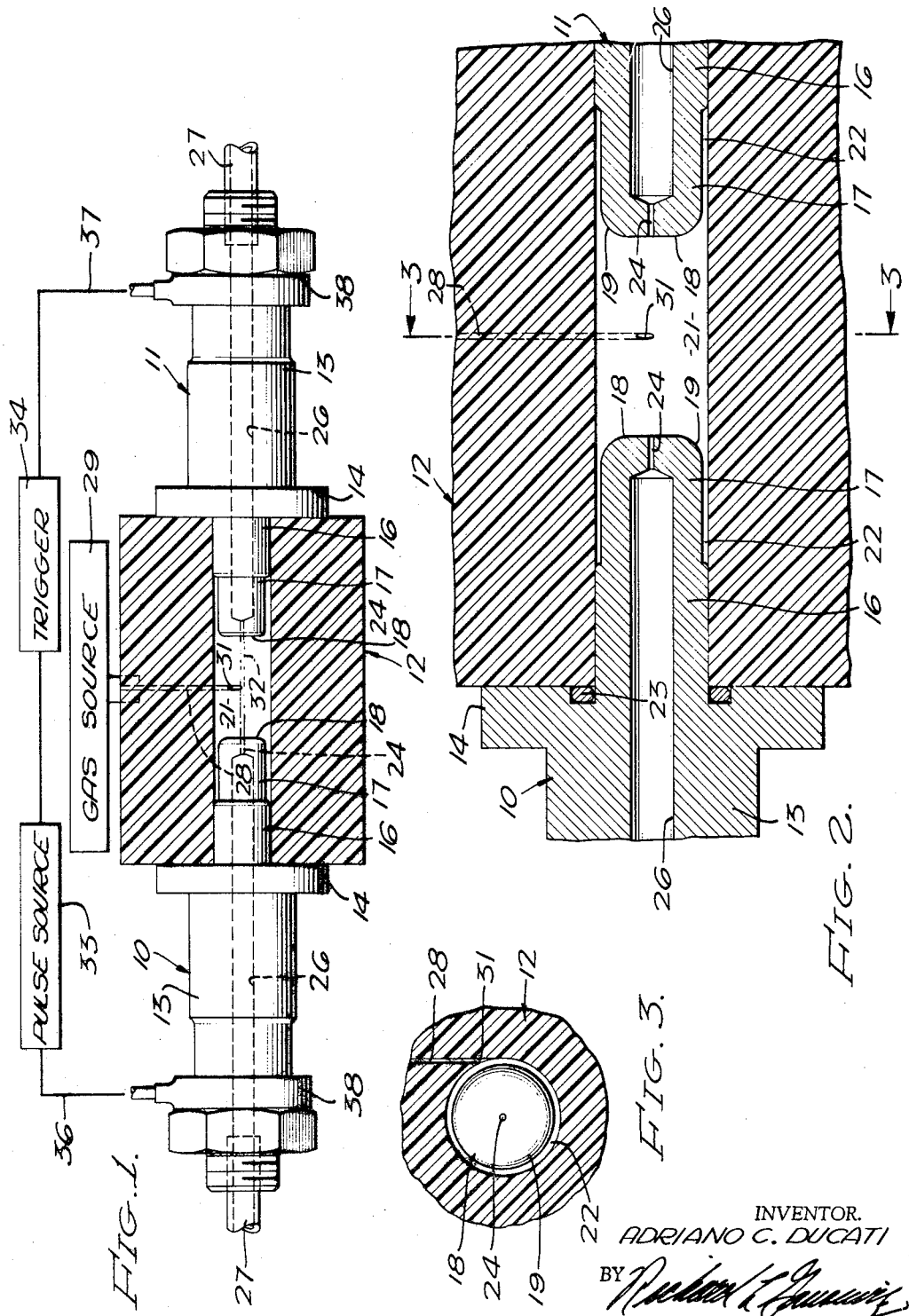
INVENTOR.
ADRIANO C. DUCATI
BY
ATTORNEY Feb. 1, 1966 A. C. DUCATI 3,233,147
APPARATUS AND METHOD FOR GENERATING HIGH-INTENSITY LIGHT
AND A HIGH TEMPERATURE AND MACH NUMBER PLASMA STREAM
Original Filed Sept. 29, 1958 3 Sheets-Sheet 2
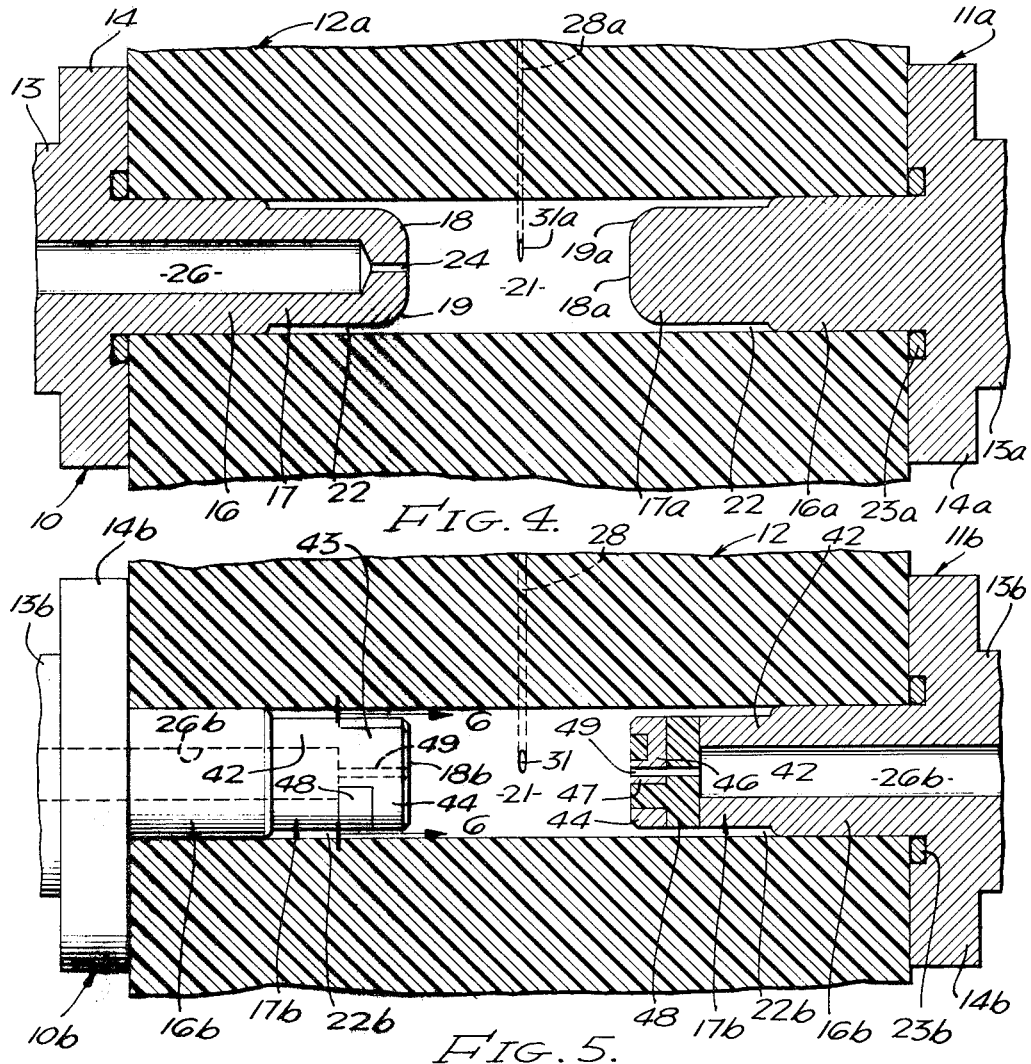
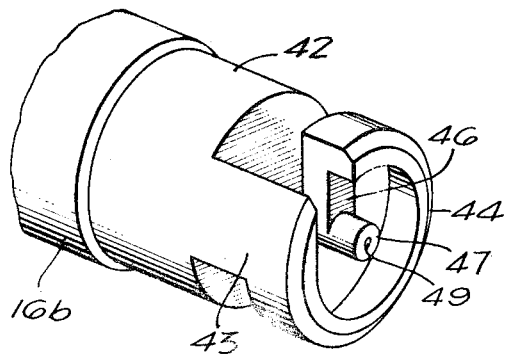
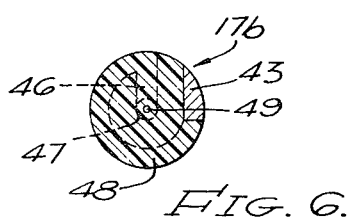
INVENTOR.
ADRIANO C. DUCATI
BY
ATTORNEY Feb. 1, 1966  A. C. DUCATI  3,233,147
APPARATUS AND METHOD FOR GENERATING HIGH-INTENSITY LIGHT
AND A HIGH TEMPERATURE AND MACH NUMBER PLASMA STREAM
Original Filed Sept. 29, 1958  3 Sheets-Sheet 3
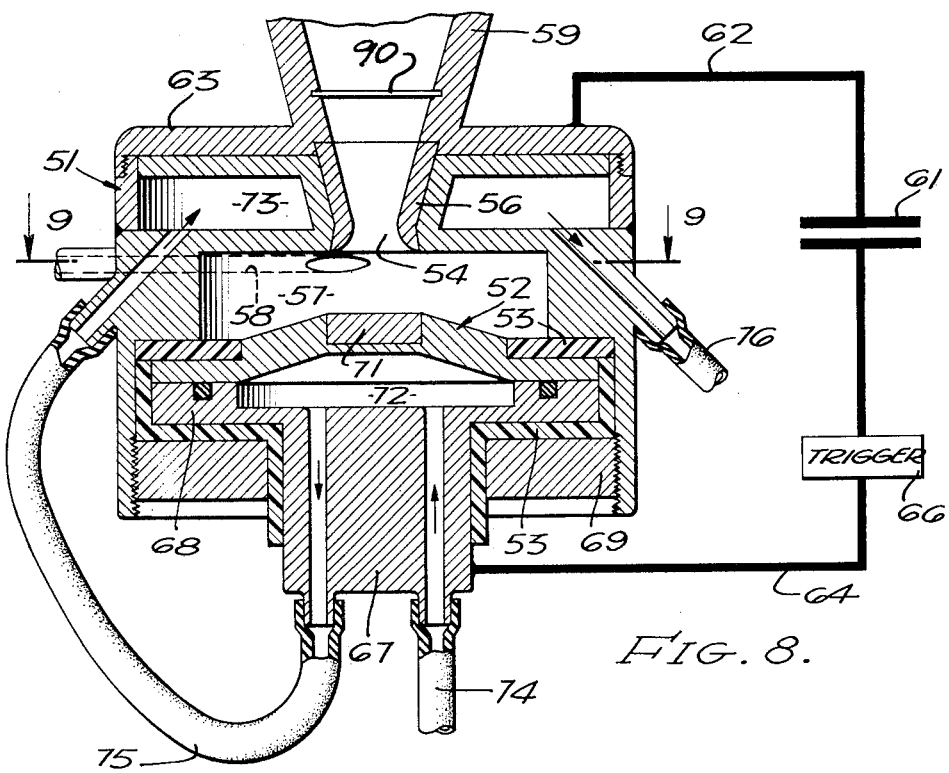
FIG. 8.
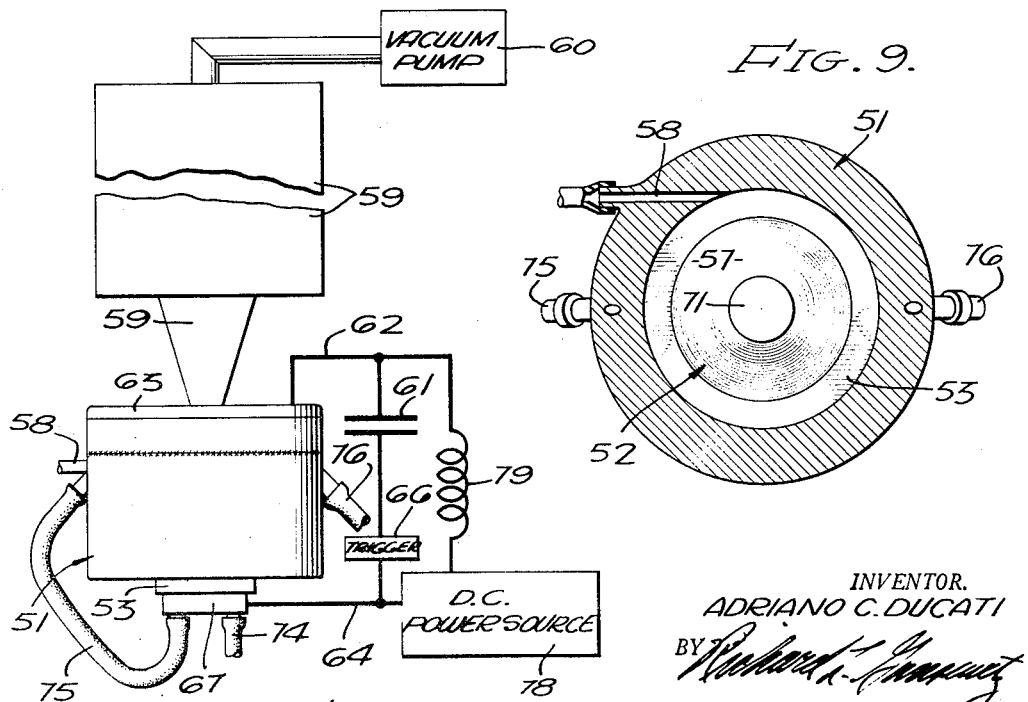
FIG. 9.
FIG. 10.
INVENTOR.
ADRIANO C. DUCATI
BY
ATTORNEY United States Patent Office 3,233,147
Patented Feb. 1, 1966

3,233,147
APPARATUS AND METHOD FOR GENERATING HIGH-INTENSITY LIGHT AND A HIGH TEMPERATURE AND MACH NUMBER PLASMA STREAM
Adriano C. Ducati, Santa Ana, Calif., assignor to Giannini Scientific Corporation, Amityville, Long Island, N.Y., a corporation of Delaware
Continuation of application Ser. No. 197,097, May 23, 1962, which is a continuation of application Ser. No. 763,926, Sept. 29, 1958. This application Dec. 21, 1964, Ser. No. 427,203
18 Claims. (Cl. 315—111)

This application is a continuation of my co-pending patent application Serial No. 197,097, filed May 23, 1962, now abandoned, for Electrical Discharge Apparatus and Method for Achieving High Temperatures and Mach Numbers, and High-Intensity Light Pulses. Said application is a continuation of patent application Serial No. 763,926, filed September 29, 1958, for Electrical Discharge Apparatus and Method for Achieving High Temperatures and Mach Numbers, now abandoned.

This invention relates to an electrical discharge apparatus and method for generating high-intensity light, and achieving high temperatures and Mach numbers.

Previous inventors have employed electrical sparks or pulse discharges in order to achieve high temperatures, but such sparks were extremely unstable and uncertain in nature. Thus, such sparks tended to follow various indeterminate elongated paths, and to shift or blow to different portions of the electrodes between which they were generated. Furthermore, and very importantly, such spark discharges were not effectively limited to small cross-sectional areas with consequent extremely high temperatures. It is therefore one of the objects of the present invention to provide an apparatus and method for achieving an extremely stable and highly predictable spark discharge having a very small cross-sectional area with consequent high current density and temperature.

It has been previously proposed to achieve relatively high Mach numbers by effecting an electrical discharge of short duration in a chamber having an outlet opening to a shock tube or tunnel. Such discharges were, however, characterized by the presence of undesirably large amounts of contaminants due to the vaporization of electrode and casing material. Such contaminants altered the characteristics of the gas (such as air) in the tube or tunnel and thereby reduced the reliability of data obtained during a shock test. It is therefore another object of the present invention to provide a method and apparatus for achieving a high-intensity electrical discharge of short duration, and consequent high-velocity gas flow, with minimum contamination of the gas.

Other objects of the present invention include providing an apparatus and method for achieving a highly stable spark discharge through the use of both fluid constriction and magnetic constriction.

Another object is to provide an apparatus and method for generating high-intensity light pulses.

Another object of the invention is to provide electrical plasma apparatus employing both a pulse discharge and a continuous discharge to achieve a high gas velocity with minimum contamination of gas by electrode and other material.

These and other objects and advantages of the invention will be more fully set forth in the following specification and claims, considered in connection with the attached drawings to which they relate.

In the drawings:

FIGURE 1 is a schematic view, partially in side elevation and partially in vertical central section, illustrating a first form of apparatus constructed in accordance with the present invention;

FIGURE 2 is an enlarged fragmentary central sectional view of the mid-portion of the showing of FIGURE 1;

FIGURE 3 is a fragmentary transverse section taken on line 3—3 of FIGURE 2;

FIGURE 4 is a view corresponding generally to FIGURE 2 but illustrating a second form of apparatus, in which a discharge outlet is provided in only one of the electrodes;

FIGURE 5 is a view, partially in central section and partially in side elevation, illustrating a third form of apparatus in which means are provided to generate a magnetic field around the spark in order to additionally stabilize and constrict the same;

FIGURE 6 is a fragmentary cross-sectional view taken on line 6—6 of FIGURE 5;

FIGURE 7 is an enlarged perspective view illustrating one of the electrodes of the embodiment of FIGURES 5 and 6, but with the insulation means not shown;

FIGURE 8 is a schematic view, primarily in longitudinal central section, showing a further form of apparatus particularly adapted to generate high Mach numbers;

FIGURE 9 is a transverse section on line 9—9 of FIGURE 8; and

FIGURE 10 is a side elevation of an apparatus corresponding generally to that shown in FIGURES 8 and 9, but additionally incorporating a continuous current source to maintain an electric arc between the electrodes for a substantial period of time.

Referring first to the embodiment shown in FIGURES 1–3, inclusive, the apparatus is illustrated to comprise a pair of corresponding metal electrode elements 10 and 11 mounted in coaxial relationship and insulated from each other by a block 12 of insulating material. Stated more specifically, each electrode 10 and 11 has an enlarged, generally tubular base portion 13 provided with a radial flange 14 which abuts one end of insulating block 12, the latter being preferably a hollow cylinder or tube of transparent plastic such as "Lucite." Integrally provided on the side of flange 14 opposite base 13 is a tubular plug portion 16 which fits closely into the cylindrical axial passage in insulating block 12. An arcing portion 17 is coaxially provided on the plug portion 16 and is generally tubular in shape, having a diameter smaller than that of the plug portion. The arcing portion terminates in a blunt radial end 18 which merges through a rounded edge 19 with the cylindrical side wall of the arcing portion.

From the above, it will be understood that the electrodes and the block 12 serve to define an annular chamber 21 coaxially between the spaced radial ends 18 of the electrodes, the chamber having annulus portions 22 formed around the arcing portions 17 as best shown in FIGURES 2 and 3. In order to insure against leakage of gas from the chamber, O-rings 23 are provided between each flange 14 and the associated end of block 12 as illustrated in FIGURE 2.

A small-diameter cylindrical nozzle passage 24 is formed coaxially in each arcing portion 17 and communicates with a much larger passage 26, the latter extending coaxially through the electrode element 10 or 11 to the extreme outer end thereof. The nozzle passage 24 is relatively short, and the wall thereof may be suitably protected by a tubular insert, not shown, formed of tungsten or other refractory metal. Each large-diameter passage 26 may discharge to the atmosphere or may be connected to a conduit 27 leading to a suitable chamber, not shown, adapted to store the gas which is passed through the apparatus as will next be described.

Gas is introduced tangentially into chamber 21 through a passage 28 which is preferably located midway between the radial surfaces 18 and lies in a plane perpendicular to the axis of cylindrical chamber 21. The passage 28 communicates with a source 29 of gas, preferably an inert gas such as argon or helium, under substantial pressure.

The cross-sectional area of tangential passage 28 at its inlet opening 31 to chamber 21 is substantially smaller than the combined cross-sectional areas of both of the nozzle passages 24. For example, each of the passages 24 and the inlet opening 31 may have a diameter of .010 inch, so that the combined cross-sectional area of both discharge passages 24 is twice the cross-sectional area of inlet opening 31.

The inert gas from source 29 is introduced through inlet opening 31 at sufficient pressure and velocity to whirl rapidly in the cylindrical chamber 21 and form a relatively clearly-defined vortex passage, indicated at 32 in FIGURE 1, coaxially between the two nozzle passages 24. The rapidly whirling or circulating gas then discharges through both passages 24 into the larger diameter passages 26, from whence it may either escape to the atmosphere or be recovered through conduits 27. The vortex passage has a very small diameter, for example less than the illustrated .010 inch diameter of each passage 24.

It is pointed out that the gas when it is introduced inlet opening 31 has a pressure which is a number of times that in each passage 26, and that such pressure decreases radially toward the center of chamber 21 until the pressure at the center of the vortex passage 32 is substantially equal to that in the passage 26. The passage diameters and other factors are selected empirically to cause the pressure gradient adjacent vortex passage 32 to be relatively steep, thereby resulting in a well-defined low-resistance vortex surrounded by a rapidly circulating blanket or envelope of gas which acts as an insulating medium.

As an illustration, the gas pressure in chamber 21 at the peripheral portion thereof may be about 75 p.s.i. absolute, whereas the pressure within the vortex passage 32 may be atmospheric. Furthermore, it is within the scope of the invention to connect the conduits 27 to a vacuum pump and thereby effect substantial evacuation of chamber 21, so that the inlet pressure adjacent opening 31 may be reduced substantially and still be many times that in passage 26.

Although the combined cross-sectional area of the discharge passages 24 should be greater than the cross-sectional area of inlet opening 31, it should not be so much greater that the gas pressure in chamber 21 radially outwardly of vortex passage 32 will be reduced excessively. Instead, and as previously indicated, the pressure at the peripheral portion of chamber 21 should be a number of times the pressure in vortex passage 32.

A power source 33, adapted to deliver a very high-current pulse, is connected through a suitable trigger or switch apparatus 34 to both of the electrodes 10 and 11. In the illustrated form, the leads 36 and 37 from the power source and trigger are connected to suitable conductor rings 38 provided around base portions 13 in electrically-conductive contact therewith. The power source 33 may comprise a low-inductance, high-capacity capacitor which is charged from a suitable direct current source, not shown. The trigger 34 may comprise an arc gap and a triggering electrode adapted to effect arcing across the gap when a voltage is applied to the electrode. The source 33 and the trigger 34 thus combine to effect flow of hundreds, thousands or millions of amperes of current through the electrodes 10 and 11 in a very short space of time such as a few milliseconds, microseconds or even a fraction of a microsecond.

It is pointed out that the cross-sectional area of chamber 21 is many times the cross-sectional area of each nozzle passage 24, and that the rapidly-circulating gas in chamber 21 effectively thermally insulates the electric spark or discharge from the cylindrical wall of the chamber 21.

Stated generally, the method comprises employing a rapidly-circulating fluid to constrict a high-intensity pulse discharge to a predetermined path of small cross-sectional area in order to achieve extremely high current densities and temperatures, with resulting high-intensity light. More specifically, the method comprises passing fluid vortically between relatively blunt sparking electrodes and discharging the fluid through a nozzle passage in at least one of the electrodes to thereby confine the spark to the vortex and additionally to form plasma which passes through the nozzle passage.

With reference to the apparatus shown in FIGURES 1–3, the method comprises passing gas under relatively high pressure from source 29 through passage 28 and tangentially through inlet opening 31 into chamber 21. The gas whirls vortically and rapidly to define the indicated vortex passage 32 between the coaxial nozzle passages 24. The gas continuously discharges through both of the passages 24 into passages 26 which, as stated above, are at much lower pressure than the pressure in the peripheral portion of chamber 21.

While the gas is thus circulating in chamber 21, the trigger means 34 is employed to close the circuit through leads 36 and 37 from pulse source 33 to electrodes 10 and 11, thereby creating a high-current electrical discharge between the arcing portions 17 of the electrodes. Because of the characteristics of the blanket or envelope of gas around the vortex, the discharge is confined to the relatively low-resistance vortex passage 32 and therefore follows a straight path directly between the nozzle passages 24 instead of following the customary bent or circuitous path between the electrodes. Not only is the discharge caused to follow the straight path, it is constricted to the vortex passage 32 so that it has an extremely high current density with resulting high temperature and luminosity. The light emanates from arc chamber 21 through the transparent wall 12 thereof. The extremely high temperature generated in vortex passage 32 converts the discharging gas into very high temperature plasma, so that streams of plasma are discharged through both of the nozzle passages 24 into passages 26.

*Embodiment of FIGURE 4*

Except as will be specifically noted, the construction of the embodiment of FIGURE 4 is identical to that of FIGURES 1–3, and corresponding reference numerals have been employed for corresponding parts.

The electrode 10 and associated apparatus is the same in FIGURE 4 as in FIGURES 1–3, and the electrode 11a is also identical except that the nozzle passage 24 and the connecting larger-diameter passage 26 are eliminated. The insulating block 12a is also the same, except that the tangential passage 28a and inlet opening 31a are caused to be smaller than in the embodiment of FIGURES 1–3 in order to compensate for the absence of the discharge passage in electrode 11a. Thus, inlet opening 31a has a diameter which is substantially smaller than that of the single nozzle passage 24.

The operation of the embodiment of FIGURE 4 is substantially the same as was previously described, except that the gas and plasma only discharge through the nozzle passage 24 in electrode 10, instead of discharging in opposite directions through both electrodes.

*Embodiment of FIGURES 5–7*

The embodiment of FIGURES 5–7 is the same as was described with relation to FIGURES 1–3, and has been correspondingly numbered, except that means are provided to effect a magnetic constricting and stabilizing action in addition to the above-described constriction by means of circulating fluid. This is accomplished by altering the construction of arcing portions 17b of electrodes 10b and 11b in such manner that the current pulse follows a loop-shaped path immediately prior to dischraging through the vortex passage 32 (FIGURE 1).

Referring particularly to FIGURES 6 and 7, the arcing portion 17b of each electrode comprises a tubular metal cylinder 42 formed integral with an axially-extending offset portion 43. A split ring 44 is integrally connected at one of its ends to the forward end of offset portion 43, coaxial with the electrode and with chamber 21. The other end of ring 44 is connected through a radial connector 46 to a cylindrical terminal 47. Terminal 47 is also disposed coaxially of the electrode and of chamber 21 and is, similarly to the ring 44, axially spaced from the end of the cylinder 42 by means of the offset portion 43.

A complementary element 48, formed of insulating material such as "Teflon," is inserted in the ring 44 and associated elements in such manner that the resulting arcing portion 17b is externally flush and cylindrical, having a radial face 18b formed cooperatively by elements 44, 47 and 48. It is pointed out that the radial connector 46 is set back from the surface 18b and is covered by insulation, so that the only conductor element adjacent the axis of chamber 21 is the forward end of the cylindrical terminal 47.

A cylindrical nozzle passage 49 is provided axially through the terminal 47 and the portion of insulator 48 inwardly thereof, such nozzle passage communicating with the previously-described larger diameter passage 26b.

The method with relation to the embodiment of FIGURES 5-7 is the same as that of FIGURES 1-3, except with relation to the arcing portion 17b of each electrode 10b and 11b. Assuming that electrode 10b is positive and electrode 11b is negative, current flows from cylinder or tube portion 42 of electrode 10b through offset portion 43, thence clockwise (as viewed in FIGURE 6) around the split ring 44 to radial connector 46, thence axially through cylinder 47 to generate the discharge in the vortex passage in the whirling gas. The current thus reaches the portion 47 of the other electrode 11b and follows the reverse path to the opposite side of the pulse source.

It will thus be seen that the current at each end of the spark or discharge follows a loop-shaped path in a plane perpendicular to the discharge, and coaxially thereof. Lines of magnetic force are thus generated which bunch around the vortex in the whirling gas and constrict and stabilize the discharge between terminals 47. This action therefore cooperates with the constricting and stabilizing effect of the whirling gas to provide a very stable discharge having an externally elevated temperature. Such magnetic constricting and stabilizing action is highly effective because of the extremely large currents which are passed through the electrodes thereby generating strong magnetic fields for the purpose indicated.

*Embodiment of FIGURES 8-9*

FIGURES 8 and 9 illustrate an apparatus which relates particularly to the plasma-generating aspects of the invention, in order to achieve high Mach numbers in a shock tube or wind tunnel apparatus and for other purposes. In principle, the embodiment of FIGURES 8 and 9 corresponds generally to that of FIGURE 4 except for the sizes of the gas-inlet passage and nozzle opening, and the shape of the latter.

The apparatus is illustrated schematically to comprise a generally cup-shaped nozzle electrode 51 and a generally disc-shaped back electrode 52 mounted coaxially of each other, the back electrode being disposed within the nozzle electrode but separated therefrom by insulating means 53. The radial wall of nozzle electrode 51 is provided axially with a nozzle opening 54 the wall of which is protected by an insert 56 formed of a refractory metal such as tungsten.

The nozzle electrode and the adjacent surface of back electrode 52 cooperatively define an annular pressure chamber 57 which is coaxial with the nozzle opening 54, and into which gas is introduced through a tangential inlet passage 58 best shown in FIGURE 9.

Gas introduced into the chamber 57 from a suitable source, not shown, therefore whirls vortically and then flows out the nozzle opening 54. The discharging gas may enter a shock tube or tunnel, schematically indicated at 59 (FIGURES 8 and 10), which is normally evacuated to a relatively high vacuum. Such evacuation is accomplished by means of a vacuum pump represented at 60 in FIGURE 10.

In order to increase the Mach number of the plasma emanating from chamber 57 through nozzle opening 54, the insert 56 and adjacent region of the shock tube or tunnel 59 may be shaped as a velocity-increasing nozzle, such as of the Laval type. The inlet end of insert 56 is rounded in order to eliminate shock and turbulence at the point of communication between the chamber 57 and nozzle opening 54.

The pulse source is indicated in FIGURE 8 as comprising a low-inductance capacitor means 61 having a high capacity. The capacitor 61 is connected through a lead 62 to a flange portion 63 of the shock tube or tunnel 59, the portion 63 being in electrically-conductive surface contact with electrode 51.

The other terminal of capacitor 61 is connected through a lead 64 and trigger or switch means 66 to a base element 67, the latter having a flange 68 which is in electrically-conductive surface contact with the periphery of back electrode 52. A retaining ring 69 is threaded into the lower portion of nozzle electrode 51 to force flange 68 against electrode 52 and to hold the various parts in assembled relationship.

Upon closing of the trigger or switch means 66, the capacitor 61 discharges to create an electric arc or discharge between nozzle insert 56 and an insert 71, of tungsten or the like, provided in the raised central portion of back electrode 52. The flow of current is through the elements 63, 51, 52, 68 and 67, all of which are formed of highly conductive metal such as copper.

Means may be provided to effect cooling of the inserts 56 and 71 in order to increase the life thereof, particularly when the apparatus is operated repeatedly in rapid succession or is employed in conjunction with a continuous discharge as will be described with relation to FIGURE 10. The cooling means may comprise cooling chambers 72 and 73 through which water or other suitable coolant is fed by means of hoses 74, 75 and 76.

Gas is first caused to flow into chamber 57 through tangential inlet passage 58 at a relatively high velocity, the pressure in the peripheral part of chamber 57 being caused to be a number of times that in the apparatus (such as number 59) with which the electric torch communicates. The diameter of the inlet passage 58 is substantially smaller than that of nozzle opening 54, so that the whirling gas forms a vortex in chamber 57 and in the communicating nozzle opening. The diameter of the vortex passage is determined by the rate of gas flow, the diameter of the throat of nozzle opening 54, and other factors. After flowing through the throat of the nozzle, the gas fans outwardly into the apparatus 59 and disperses, it being pointed out that the apparatus 59 is preferably evacuated as previously stated.

Since the vortex passage in the whirling gas is at a very much lower pressure than that in the peripheral part of chamber 57, the vortex passage serves as a low-resistance path for the electric spark or discharge which takes place when trigger or switch 66 is closed to effect discharge of capacitor 61. Stated otherwise, the rapidly circulating gas in chamber 57 and along the wall of nozzle opening 54 provides an insulation effect which substantially prevents arcing or discharge except in the vortex passage.

The very large current, and high current density, present in the vortex passage creates an extremely high temperature and causes a shock wave to flow into apparatus 59 at very high velocity. However, the rapidly moving gas is relatively uncontaminated by electrode material, so that the test data obtained with relation to specimens within apparatus 59 is relatively accurate. The gas employed may be air, argon, nitrogen, etc.

Embodiment of FIGURE 10

The apparatus illustrated in FIGURE 10 may be identical to that shown and described with relation to FIGURES 8 and 9, except that a D.C. power source 78 and an inductance coil 79 are series connected across the combination of capacitor 61 and trigger means 66. In practicing the method with the apparatus of FIGURE 10, voltage may first be applied between the inserts 56 and 71 from the D.C. power source 78, and an electric arc initiated therebetween. The source 78 is so regulated that the arc current is relatively low (such as below 100 amperes) in order to minimize contamination of the gas with the electrode material.

The capacitor 61 is then (or previously) charged, and trigger 66 is closed to effect discharge of the capacitor along the ionized path created through the vortex passage in the whirling gas as a result of the continuous discharge or arcing effect produced by source 78. The pulse thus obtained has a very large current and is of short duration, and results in very high temperatures and Mach numbers.

The inductance coil 79 minimizes flow of pulse current through power source 78 upon discharge of capacitor 61. It is within the scope of the invention to provide means to momentarily disconnect the power source 78 from the circuit during the discharge of capacitor 61 and then to reconnect the power source as soon as the capacitor has discharged, thereby completely preventing flow of capacitor discharge current through the power source 78.

With relation to both of the embodiments of FIGURES 8–9 and 10, a thin diaphragm schematically shown at 90 (FIGURE 8) may be provided in accordance with conventional shock-tube practice. The diaphragm is adapted to rupture upon discharge of capacitor 61, after evacuation of tube or tunnel 59 by pump 60, to provide very high Mach numbers. Where the diaphragm is employed in the embodiment of FIGURE 10, the arc from D.C. source 78 is struck only a small fraction of a second before discharge of the capacitor. Passage 58 may be open to the ambient atmosphere.

Such terms as "annular chamber" are intended to denote chambers wherein the wall is a surface of revolution about a central axis.

Various embodiments of the present invention, in addition to what has been illustrated and described in detail, may be employed without departing from the scope of the accompanying claims.

I claim:

1. Apparatus for generating heat and light, which comprises:
   wall means to define a chamber,
       said wall means having a transparent portion through which light may radiate from said chamber through said wall means,
   first and second electrodes having portions disposed to effect an electrical discharge therebetween in said chamber,
   means connected to said electrodes to effect an electrical discharge in said chamber between said electrode portions,
   means to introduce gas continuously into said chamber in such manner that said gas flows vortically therein about an axis extending between said electrode portions, and
   means to drain gas continuously from said chamber at at least one point which is adjacent the region where said electrical discharge engages said portion of said first electrode, said point being much closer to said axis than is the region where said gas is introduced into said chamber,
       said vortically-flowing gas causing said electrical discharge to be small in diameter and to follow a straight line path between said electrode portions through the vortex passage or canal in said vortically-flowing gas.

2. The invention as claimed in claim 1, in which said gas drainage means comprises a passage through said portion of said first electrode, and in which said axis extends through said passage.

3. The invention as claimed in claim 1, in which said electrical-discharge means generates a spark of short duration.

4. The invention as claimed in claim 1, in which said gas-introduction means introduce an inert gas.

5. Apparatus for generating heat and light, which comprises:
   wall means to define a chamber,
       said wall means having a transparent portion through which light may radiate from said chamber through said wall means,
   first and second elongated electrodes having end portions disposed in said chamber to maintain an electrical discharge therebetween in said chamber,
   means connected to said electrodes to effect an electrical discharge in said chamber between said electrode end portions,
   means to introduce gas continuously into said chamber in such manner that said gas flows vortically therein about an axis extending between said electrode end portions, the region of gas introduction into said chamber being relatively remote from said axis, and
   means to drain said gas continuously from said chamber at at least one point which is relatively adjacent said axis and is adjacent the region where said electrical discharge engages said end portion of said first electrode,
       said vortically-flowing gas causing said electrical discharge to be small in diameter and to follow a straight line path between said electrode end portions through the passage or canal in said vortically-flowing gas,
       said wall means and electrodes being free of drainage means for said gas except at points relatively adjacent both said axis and the region where said electrical discharge engages the end portion of at least one of said electrodes.

6. Apparatus for generating heat and light, which comprises:
   wall means to define a chamber,
       said wall means having a transparent portion through which light may radiate from said chamber through said wall means,
   first and second electrodes having end portions disposed to maintain an electrical discharge therebetween in said chamber,
   means connected to said electrodes to effect an electrical discharge in said chamber between said electrode end portions,
   means to introduce gas continuously into said chamber in such manner that said gas flows vortically therein about an axis extending between said electrode end portions, and
   means to drain said gas continuously from said chamber through said first electrode at at least one point which is adjacent the region where said electrical discharge engages said end portion of said first electrode,
       said vortically-flowing gas causing said electrical discharge to follow a straight line path between said electrode end portions through the passage or canal in said vortically-flowing gas,
       said wall means and electrodes being free of drainage openings for said gas except at points adjacent the region where said electrical discharge engages the end portion of at least one of said electrodes.

7. Apparatus for generating heat and light, which comprises:
    first wall means to define a cylindrical side wall of a chamber,
        at least a major part of said first wall means being transparent,
    second and third wall means to define, respectively, the opposed end walls of said chamber,
    first and second inwardly-projecting elongated electrode portions provided, respectively, on said second and third wall means generally axially of said chamber,
        said electrode portions being adapted to receive the opposite ends of an electrical discharge,
    means to generate an electrical discharge in said chamber between said first and second electrode portions,
    gas-inlet means disposed a substantial distance radially-outwardly from the axis of said chamber to introduce gas generally tangentially into said chamber whereby said gas flows vortically therein about the axis of said chamber,
    means to supply inert gas continuously to said gas-inlet means for vortical flow in said chamber, and
    gas-outlet means provided through at least one of said first and second electrode portions to drain gas continuously from said chamber,
        the intake portion of said gas-outlet means being disposed a substantial distance radially-inwardly from said gas-inlet means and adjacent at least one of said ends of said electrical discharge, whereby to form a relatively low-pressure vortex passage or canal through the vortically flowing gas between said electrode portions, said electrical discharge passing through said canal and being stabilized and constricted therein.

8. The invention as claimed in claim 7, in which said intake portion of said gas-outlet means is at least one passage located closely adjacent said axis, whereby to cause said vortex passage to have a small diameter.

9. The invention as claimed in claim 7, in which substantially all of said first wall means is transparent.

10. The invention as claimed in claim 7, in which said means to generate an electrical discharge is operative to generate a spark discharge of short duration.

11. The invention as claimed in claim 7, in which the cross-sectional area of said gas-inlet means is smaller than that of said gas-outlet means.

12. A method of generating heat and light, which comprises:
    defining a chamber having a wall which is a surface of revolution about a central axis,
    providing in said chamber and adjacent said axis the electrical-discharge portions of first and second electrodes,
    generating within said chamber between said discharge portions a high-current electrical discharge, the ends of said discharge engaging said discharge portions,
    continuously introducing gas into said chamber in a manner effecting vortical flow of said gas about said axis,
    continuously draining gas from said chamber at a region which is adjacent at least one of said ends of said electrical discharge, and which is much closer to said central axis than is the region of gas introduction into said chamber,
        said gas defining a vortex passage or canal along said axis and through which said electrical discharge passes for stabilization and constriction by said gas, and
    transmitting from said chamber the light generated by said electrical discharge,
        said transmission being along a path independent of the gas-introduction and gas-drainage paths for said gas.

13. A method of generating heat and light, which comprises:
    defining a chamber having a wall which is a surface of revolution about a central axis,
    providing in said chamber and adjacent said axis the electrical-discharge portions of first and second elongated electrodes,
    generating within said chamber between said discharge portions a high-current electrical discharge, the ends of said discharge engaging said discharge portions,
    continuously introducing an inert gas tangentially into said chamber in a manner effecting vortical flow of said gas about said axis, and at a region relatively remote from said axis,
    continuously draining gas from said chamber through one of said discharge portions and at a region which is relatively adjacent said axis and is adjacent said electrical discharge,
        said gas defining a small-diameter vortex passage or canal along said axis and through which said electrical discharge passes for stabilization and constriction by said gas, and
    transmitting from said chamber the light generated by said electrical discharge,
        said transmission being along a path independent of the gas-introduction and gas-drainage paths for said gas.

14. Apparatus for creating a high-velocity gas flow, which comprises:
    means to define a chamber,
    means to effect substantial evacuation of said chamber,
    a nozzle electrode having a nozzle opening communicating with said chamber,
    a back electrode spaced and insulated from said nozzle electrode opposite said nozzle opening,
    means to define an annular chamber between said nozzle and back electrodes and coaxial with said nozzle opening,
    means to introduce gas tangentially into said annular chamber at a sufficient velocity to effect vortical flow therein and subsequent passage through said nozzle opening into said substantially evacuated chamber,
    low-inductance high-capacity capacitor means,
    diaphragm means provided in sealing relationship between said annular chamber and said substantially evacuated chamber and adapted to rupture upon creation of a high-power discharge in said annular chamber, and
    electric circuit means to effect discharge of said capacitor means through the vortex passage in said gas between said electrodes to thus cause said diaphragm to rupture and plasma to flow into said substantially evacuated chamber at very high velocity.

15. An electrical discharge apparatus, comprising:
    first and second electrode means spaced and insulated from each other,
    means to generate a high-current electric spark discharge of short duration between said electrode means,
    means to effect vortical flow of gas in the space between said electrode means and to create a low-pressure vortex passage extending between said electrode means,
        said gas discharging through an opening provided in at least one of said electrode means and communicating with said vortex passage, and
    means to generate a magnetic field substantially encompassing at least a portion of said spark discharge,
        said last-named means cooperating with the vortically-flowing gas to maintain said spark discharge effectively in said vortex passage in stabilized condition.

16. Apparatus for generating high Mach numbers comprising:

means to define a chamber,
means to effect substantial evacuation of said chamber,
means to define a second chamber communicating through a nozzle opening with said first-mentioned chamber,
    said last-named means including wall means forming a surface of revolution about the axis of said nozzle opening,
means to effect vortical flow of a gas in said second chamber about said axis and subsequent flow of said gas through said nozzle opening into said first-mentioned chamber, and means to generate a high-current spark discharge of short duration along said axis in said second chamber to thereby convert at least a portion of said vortically-flowing gas into high-temperature plasma which discharges at high velocity through said nozzle opening into said first-mentioned chamber.

17. Apparatus for generating heat and light, which comprises:
wall means to define a chamber,
    said wall means having a transparent portion through which light may radiate from said chamber through said wall means,
first and second electrodes having end portions disposed to maintain an electrical discharge therebetween in said chamber,
means connected to said electrodes to effect an electrical discharge in said chamber between said electrode end portions,
means to introduce gas continuously into said chamber in such manner that said gas flows vortically therein about an axis extending between said electrode end portions, and
means to drain gas continuously from said chamber at at least one point which is adjacent said axis and is also adjacent said electrical discharge,
    said vortically-flowing gas causing said electrical discharge to follow a straight line path between said electrode end portions through the passage or canal in said vortically-flowing gas.

18. A method of generating heat and light, which comprises:
defining a chamber having a wall which is a surface of revolution about a central axis,
providing in said chamber and adjacent said axis the electrical-discharge portions of first and second electrodes,
generating within said chamber between said discharge portions a high-current electrical discharge,
continuously introducing gas into said chamber in a manner effecting vortical flow of said gas about said axis,
continuously draining gas from said chamber through at least one of said discharge portions and at a region which is adjacent said electrical discharge,
    said gas defining a vortex passage or canal along said axis and through which said electrical discharge passes for stabilization and constriction by said gas, and
transmitting from said chamber the light generated by said electrical discharge,
    said transmission being along a path independent of the gas-introduction and gas-drainage paths for said gas.

References Cited by the Examiner

UNITED STATES PATENTS

| | | | |
|---|---|---|---|
| 2,472,115 | 6/1949 | Mayer | 315—241 |
| 2,922,869 | 1/1960 | Giannini et al. | 315—111 |
| 3,064,153 | 11/1962 | Gage | 315—111 |

References Cited by the Applicant

"Untersuchungen an einem Wasserstoff-Hochdruckbogen," by Walter Nissen, Zeitschrift für Physik, volume 139, pages 638–648, 1954.

A portion (pages 126 and 127) of an article entitled "Uber das Elektronenaffinitatesspektrum neutraler Wasserstoffatome," by W. Lochte-Holtgreven and W. Nissen, from volume 133, Zeitschrift für Physik, submitted 1952.

German Patent No. 809,323, issued July 26, 1951, to Erwin Marx.

A portion of page 1088, volume 29, Elektrotechnische Zeitschrift, 1908, containing a description of work by O. Schonherr, from Zeitschr. f. angewandte Chemie, volume 21, 1908, page 1633.

"Das kontinuierliche Spektrum des Kohlelichtbogens," by H. Maecker, Zeitschrift für Physik, volume 114, pages 500–514, 1939.

"Das kontinuierliche Spektrum des Kohlelichtbogens II," by H. Maecker, volume 116, Zeitschrift für Physik, 1940, pages 257–266.

"Uber eine neue Entladungsform des stabilisierten Lichtbogens," by W. Lochte-Holtgreven and H. Maecker, volume 116, Zeitschrift für Physik, 1940, pages 267–270.

"Ein Lichtbogen für hohe Leistungen," by H. Maecker, Zeitschrift für Physik, volume 129, pages 108–122, 1951.

GEORGE N. WESTBY, *Primary Examiner.*

S. D. SCHLOSSER, *Assistant Examiner.*